United States Patent
Keane et al.

(10) Patent No.: US 6,555,994 B1
(45) Date of Patent: Apr. 29, 2003

(54) PREDICTIVE CONTROL OF A GENERATOR OUTPUT

(75) Inventors: Anthony R. A. Keane, Webster, NY (US); Daniel M. Gill, Rochester, NY (US)

(73) Assignee: ENI Technology, Inc., Rochester, NY (US)

( * ) Notice: Subject to any disclaimer, the term of this patent is extended or adjusted under 35 U.S.C. 154(b) by 105 days.

(21) Appl. No.: 09/686,403

(22) Filed: Oct. 11, 2000

(51) Int. Cl.$^7$ ................................................. H02P 9/00
(52) U.S. Cl. ............................. 322/36; 322/25; 322/27; 322/28
(58) Field of Search ............................. 322/25, 27, 28, 322/36, 37

(56) References Cited

U.S. PATENT DOCUMENTS

| | | | | |
|---|---|---|---|---|
| 4,451,879 A | * | 5/1984 | Welch et al. | 318/591 |
| 5,013,995 A | * | 5/1991 | Rashid | 322/25 |
| 5,153,498 A | * | 10/1992 | Parro | 322/25 |
| 5,298,851 A | * | 3/1994 | DeNardis | 322/28 |
| 5,325,043 A | * | 6/1994 | Parro | 322/23 |
| 5,583,420 A | * | 12/1996 | Rice et al. | 322/25 |
| 5,754,424 A | * | 5/1998 | Melvin | 318/561 |
| 5,801,516 A | * | 9/1998 | Rice et al. | 322/18 |
| 5,968,847 A | | 10/1999 | Ye et al. | 437/734 |

* cited by examiner

Primary Examiner—Nicholas Ponomarenko
(74) Attorney, Agent, or Firm—Harness, Dickey & Pierce, P.L.C.

(57) ABSTRACT

The present control circuit and method extends the operating range of digitally sampled control loops. A programmable output of a generator is controlled. The programmable output includes a an output level having a corresponding set point. The generator has a drive input that is driven to an actual drive point for controlling the output level of the programmable output. A set point corresponding to a requested output level is determined. A predicted drive point is then determined. The actual drive point of the generator drive input is forced to the predicted drive point. The output level of the programmable output is sensed. A digital output signal that is representative of the sensed output level is generated. The actual drive point of the generator drive input is controlled based on the digital output signal, such that the output level of the programmable output is controlled. The actual drive point corresponding to the requested output level is then stored.

22 Claims, 3 Drawing Sheets

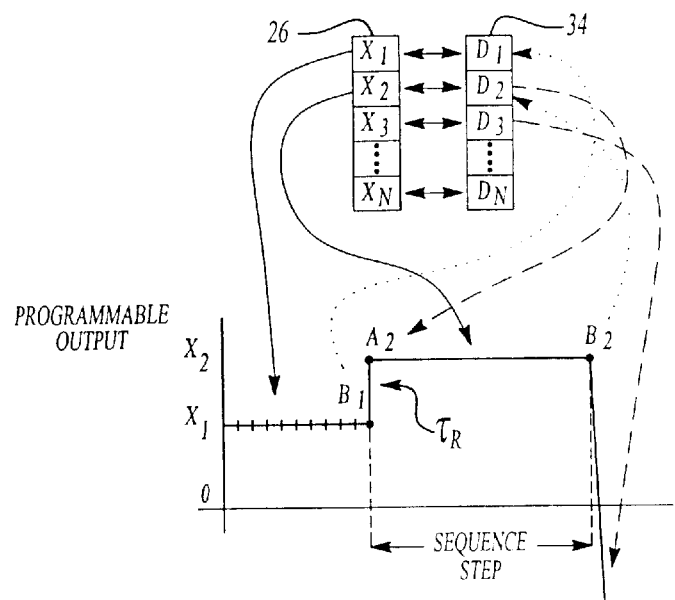
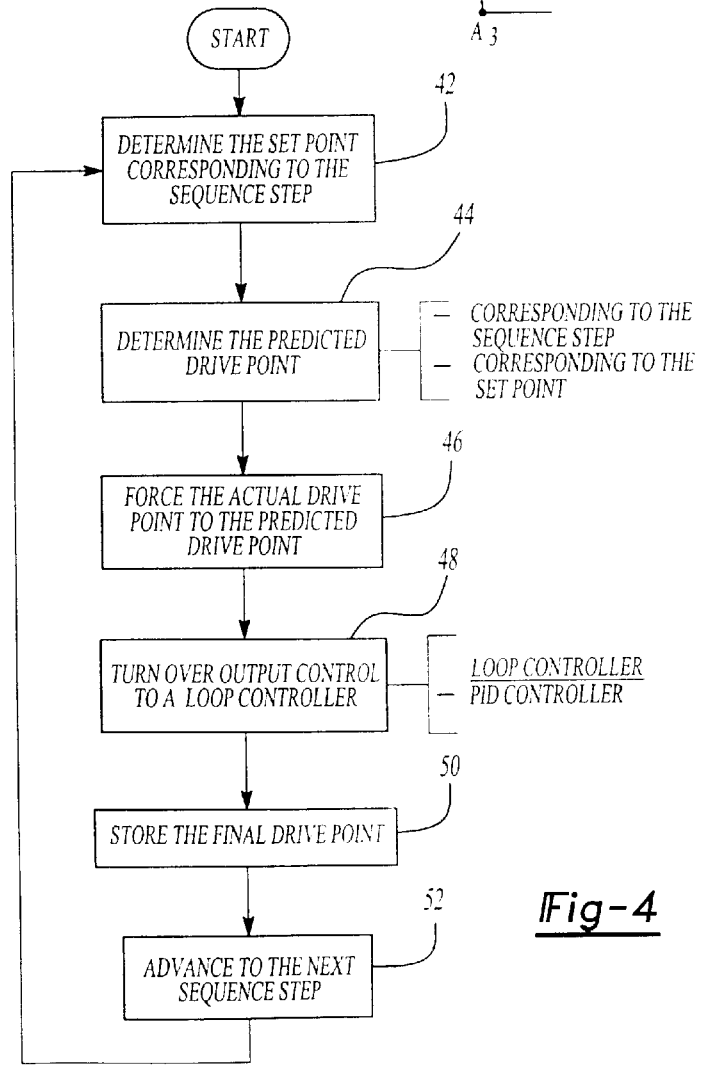

PREDICTIVE CONTROL OF A GENERATOR OUTPUT

BACKGROUND AND SUMMARY OF THE INVENTION

The present invention relates generally to generators that have a programmable output, and in particular to generators that employ digital sampling techniques to control a programmable output.

Generators that provide a programmable output having pulse capability generally employ either an analog control loop or a high-speed digital control loop in order to provide fast rise and fall times. When controlling the output pulse of a generator using digital sampling techniques the response time is largely a function of the sample rate and the group delays of the analog to digital (A/D) and digital to analog (D/A) converters. Therefore, a lower limit is placed on the response time of a digitally sampled control loop. Conventional digital control loops have been unable to provide response times that are not limited by the sample rates of the A/D and D/A that are used in the circuit. In addition, using a very fast A/D and DSP having a sufficient sample rate is expensive and requires additional circuit area.

While conventional generator control techniques can be used to provide programmable outputs having pulse capability, those techniques have not proven capable of extending the operational range of digital sampling control loops. Also, conventional generator control circuits require expensive high performance digital or analog techniques to be capable of providing pulse outputs with fast transition times.

The present control circuit and method extends the operating range of digitally sampled control loops without resorting to expensive A/D converters by controlling the programmable output of a generator. In particular, the output of the loop controller is driven to a predicted drive point which forces the programmable output to approximately the desired set point.

As subsequently described in greater detail, the programmable output includes an output level having a corresponding set point. The generator has a drive input that is driven to an actual drive point for controlling the output level of the programmable output. A set point corresponding to a requested output level is determined. A predicted drive point is then determined. The actual drive point of the generator drive input is forced to the predicted drive point. The output level of the programmable output is then sensed. A digital output signal that is representative of the sensed output level is generated. The actual drive point of the generator drive input is controlled based on the digital output signal, such that the output level of the programmable output is controlled. The actual drive point corresponding to the requested output level is then stored.

For a more complete understanding of the invention, its objects and advantages, reference may be had to the following specification and to the accompanying drawings.

BRIEF DESCRIPTION OF THE DRAWINGS

FIG. 3 illustrates the relationship between drive point storage and retrieval points in accordance with the presently preferred embodiment and a pulse waveform;

FIG. 4 illustrates a presently preferred method of controlling a generator pulse output in accordance with the teachings of the invention;

DETAILED DESCRIPTION OF THE PREFERRED EMBODIMENT

Figure 1:
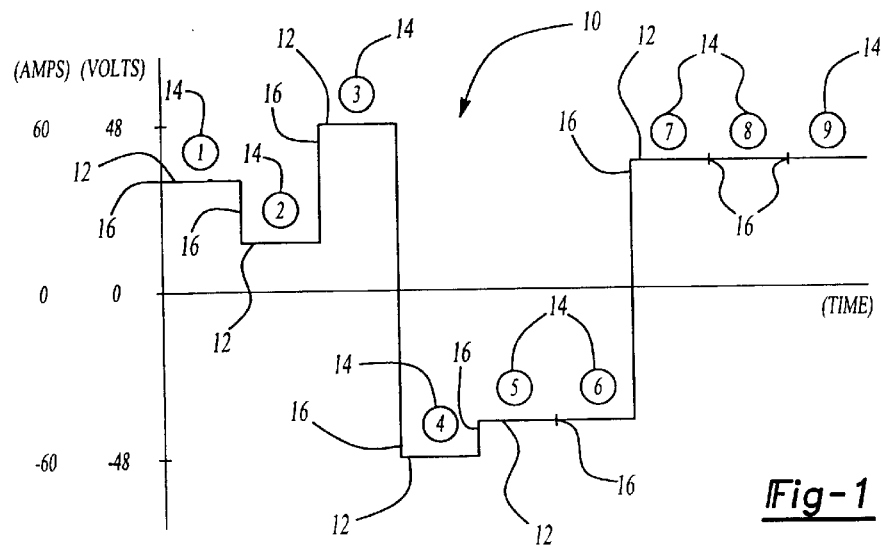
FIG. 1 is an illustration of a desired profile of a generator programmable output.

Referring to FIG. 1, an exemplary output waveform 10 of a programmable output generator is illustrated. In a preferred mode of operation, the output waveform 10 comprises numerous sequence steps 12 that are preselected by a user. Typically, each sequence step 12 defines a time period over which a predefined output such as voltage, current, or power is maintained. Each sequence step 12 is defined by a sequence point 14 and a set point 16. The sequence point 14 is generally an increasing numeric which is assigned to succeeding sequence steps. The set point 16 describes the desired amplitude of the output for the corresponding sequence step 12. In an alternative mode, a user merely selects a predefined output. There is no sequence step or time period associated with the selected output.

Figure 2:
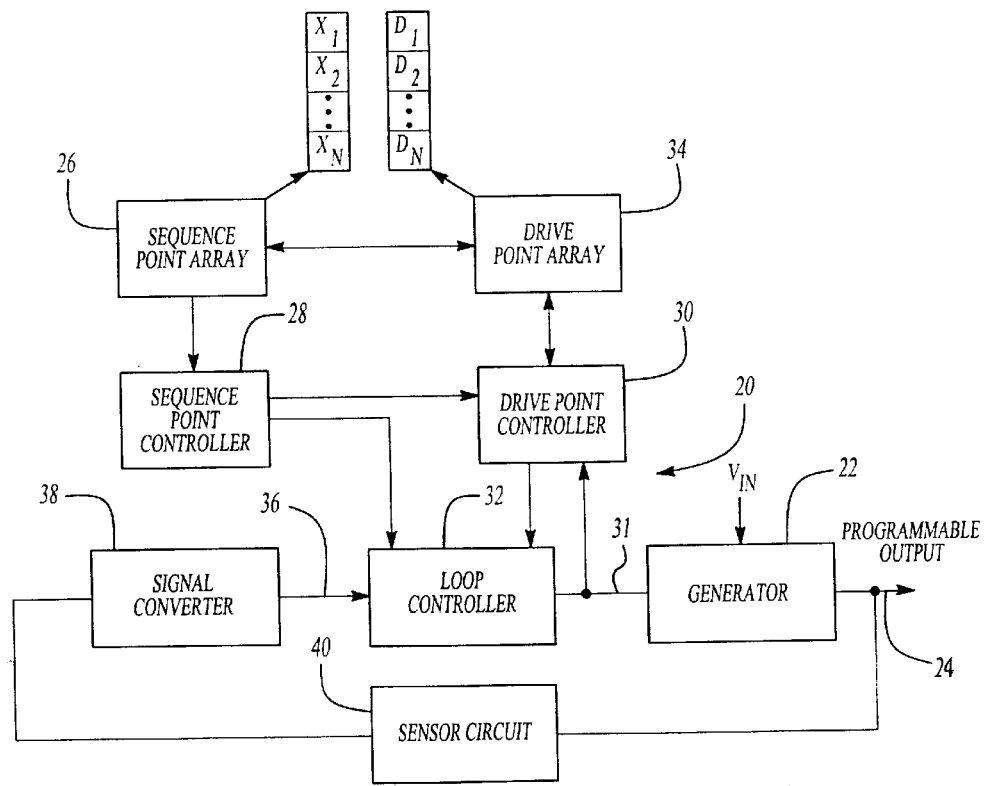
FIG. 2 is a block diagram illustrating a presently preferred embodiment of a control system in accordance with the teachings of the invention.

Referring to FIG. 2, a presently preferred embodiment of a predictive control circuit 20 according to the present invention is shown in combination with a generator 22. While the present invention is shown and described as controlling an electro-chemical deposition (ECD) generator 22, it will be appreciated that this application for the control circuit 20 is merely exemplary and that the generator 22 could be any controllable power source. The predictive control circuit 20 operates by cycling a programmable output 24 through a predetermined set of sequence steps. A sequence step in the preferred embodiment is a minimum of 100 usec, however the invention encompasses variable as well as fixed time periods, and also time periods that are greater or lesser than 100 usec. As illustrated in FIG. 1, each sequence step is defined by a sequence point and a set point. In the presently preferred embodiment, the set points are stored relative to sequence points in a sequence point array 26. However, the scope of the invention encompasses storing the set points in discrete memory locations as well as receiving set points that are not associated with a sequence step. Coupled to the sequence point array 26 is a sequence point controller 28 for determining the set point that corresponds with a specific sequence point or requested output. The sequence point controller 28 provides the set point, the corresponding sequence point, or the requested output to a drive point controller 30 and a loop controller 32.

The drive point controller 30 determines a drive signal 31 to be supplied to the loop controller 32. In the preferred embodiment, the drive point controller 30 uses the sequence point provided by the sequence point controller 28 to determine a predicted drive signal to supply to the loop controller 32. The drive signal is described by drive points that are stored in prediction memory. In the preferred embodiment, a drive point array 34 is used to store drive points corresponding to the sequence point. The scope of the invention additionally contemplates using the set point or requested output either in combination with the sequence point or alone to determine an appropriate drive signal. The drive point controller 30 also updates the drive point information stored in the drive point array 34. Prior to changing from one sequence step to the next sequence step, the drive point controller 30 updates the drive point array 34 with a measured drive signal. The scope of the invention includes updating the drive point array 34 with other representations of the measured drive signal including statistical representations such as a running average, a peak value, a minimum value, and a mean value. Although in the preferred embodiment only the drive point corresponding to the sequence step is updated, it is envisioned that the drive point controller 30 may update all the drive points in the drive point array 34. The updated drive point values may be interpolated from the measured drive signal using for example a linear or a least squares interpolation scheme. In addition, it is envisioned that only a subset of drive values may be updated such as those that approximately correspond to the set point that is associated with the sequence step.

The loop controller 32 provides closed loop control of the programmable output 24 once the drive signal has been driven to the predicted drive point. In the preferred embodiment, the loop controller 32 is a proportional-integral-derivative (PID) controller that is implemented in a Motorola 56303 digital signal processor.

Those skilled in the art will recognize that the invention may be used with other controller configurations. It is also within the scope of the invention to replace the digital signal processor with an analog logic array or logic elements that mirror the function of the processor. The loop controller 32 uses the set point received from the sequence point controller 28 as a reference input. A converted signal input 36 that is a digital representation of the programmable output 24 is compared to the reference input, in response to which the loop controller 32 generates the drive signal 31. As is known to those skilled in the art, a control loop that employs digital conversion of a signal universally includes a delay time that limits the time response of the loop. The limited time response of the control loop is particularly troublesome in systems having a pulsed output. In such systems, the ability of the control loop to drive the output so that the desired fast rising and falling edges of the pulsed output are created is limited by the time response. As described earlier, conventional systems design around the time response limitation by either employing an analog control loop or a high performance digital control loop (if it is fast enough) with its attendant price and size costs.

The present invention solves the time response limitation by driving the loop controller output to a predicted drive point that forces the programmable output 24 to approximately the desired set point. To minimize undesirable overshoots and undershoots of the programmable output 24, the response of the loop controller 32 in the presently preferred embodiment is slowed-up.

In response to the drive signal 31, the generator 22 converts input power to the programmable output 24. By varying the drive point of the drive signal 31 the input power conversion performed by the generator 22 is controlled. The conversion ratio of the programmable output 24 to the input power is described by a transfer function. The transfer function of the generator 22 used in conjunction with the preferred embodiment is a complex non-linear ratio that includes a reciprocal of the input power. Due to the nonlinearity of the transfer function, it is difficult to calculate a predicted drive point for a given input power and a desired programmable output. Additionally, gain drifts from temperature and operating point changes, as well as load changes, further increase the complexity of calculating the drive point. The preferred embodiment of the present invention avoids the complexity of having to accurately calculate a predicted drive point by storing a drive point that is obtained while the programmable output 24 is being controlled by the loop controller 32.

A sensor circuit 40 samples the programmable output 24 and detects electrical characteristics of the output 24 such as voltage, current, power, and phase. The sampled output is coupled to the signal converter 38 for conversion to a digital signal. In the preferred embodiment, a Motorola analog to digital converter operating at 200 kHz is employed as the signal converter 38.

However, the scope of invention contemplates the use of other means for converting an analog signal to a digital signal.

With additional reference to FIG. 3, the operation of the predicted control circuit 20 will be described. FIG. 3 illustrates an exemplary waveform of the programmable output 24. At time zero, the loop controller 32 actively regulates the programmable output 24 to an output level, $X_1$, that corresponds to the set point for that sequence step or that requested output level. The loop controller 32 continues to regulate the output 24 until point B. of the waveform is reached. At point $B_1$, the drive point that is output from the loop controller 32 is stored in the drive point array 34. The drive point corresponding to the next sequence step or next requested output level is retrieved from prediction memory and used to force the drive signal to a value that causes the programmable output 24 to track the desired transition from point $B_1$ to point $A_2$. By forcing the drive signal, delays inherent in the loop controller response are avoided so that the rise time of the programmable output 24 is limited merely by the response time of the generator 22 to changes in the drive signal 31. From point $A_2$, the loop controller 32 again actively regulates the programmable output 24 to the set point corresponding to the corresponding sequence step or requested output level. At point $B_2$, the drive point is again stored in prediction memory within the drive point array 34. The drive point corresponding to the next sequence step is retrieved from prediction memory and used to force the drive input to a level that drives the programmable output 24 to the desired level.

Referring to FIG. 4, the process of generating a pulsed output is illustrated. At step 42, a set point corresponding to the sequence step or requested output level is determined. Then, a predicted drive point corresponding to either the sequence step or the set point is determined, step 44. The actual drive point of the drive signal 31 is forced to the predicted drive point, step 46. Control of the programmable output 24 is then turned over to the loop controller 32, step 48. The loop controller 32 compares a digital representation of the programmable output 24 to the set point corresponding to the sequence step or requested output level. Towards the end of the sequence step, the actual drive point of the drive signal 31 is stored, step 50. In the preferred embodiment, the predicted drive point is updated with the actual drive point obtained at step 50. It is within the scope of the invention to calculate a statistical measure from the predicted drive point and the actual drive point, and to store the statistical drive point for future use as a predicted drive point. The process then advances to the next sequence step, step 52.

Figure 5:
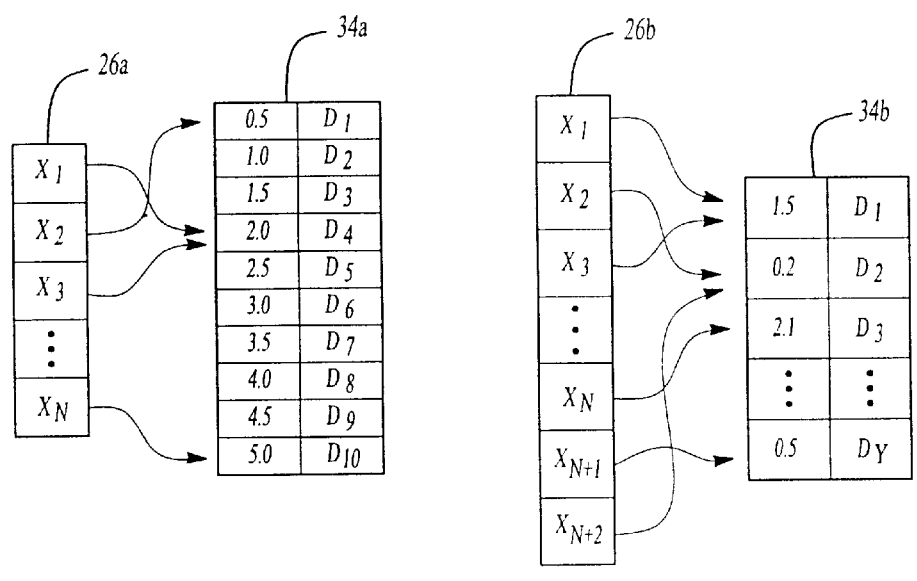
FIG. 5 illustrates several configurations for sequence memory and prediction memory in accordance with the teachings of the invention.

Referring to FIG. 5, several configurations for relating prediction memory to sequence memory are illustrated. In a first configuration, the drive point array 34a includes set points and corresponding drive points arranged in a tabular manner. The sequence point array 26a includes pointers corresponding to each sequence step, each of which points to an associated set point in the drive point array 34a. The drive point array 34*a* may be either a fixed length including a predetermined number of set points or the array 34*a* may be dynamically expandable to include additional set points with corresponding drive points. Initial values for the additional drive points may be interpolated from existing drive points for may be initialized for a predetermined constant.

The second configuration is similar to the first configuration with the exception that the set points are not arranged in increasing order. Here, pointers from the sequence point array 26*b* again point to corresponding set points that are stored in the drive point array 34b. Additional pointers are included in the sequence point array 26*b* for every additional sequence step that is added to the programmable output 24.

Figure 6:
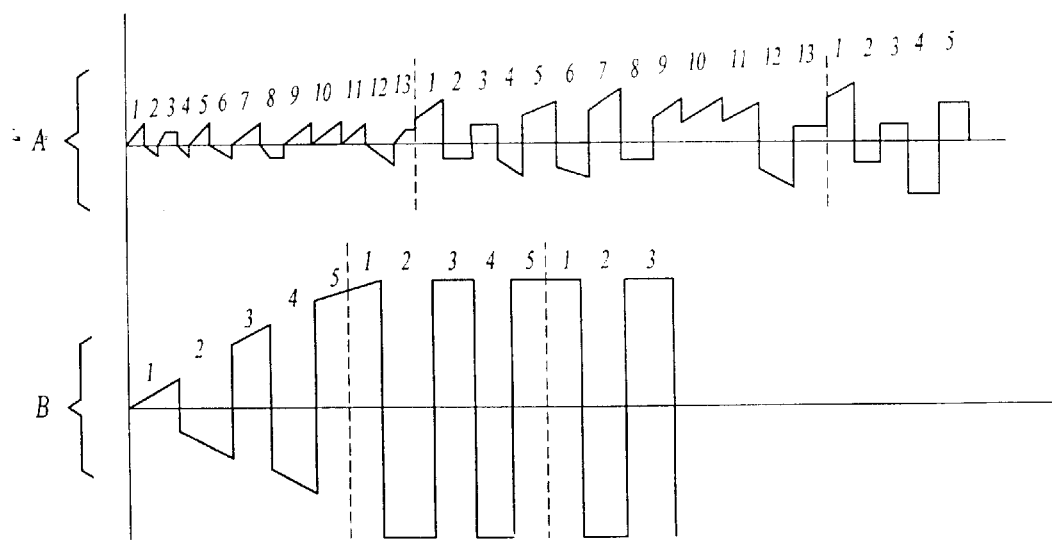
FIG. 6 illustrates a softstart capability of the presently preferred embodiment of the invention.

Referring to FIG. 6, waveforms of the programmable output 24 during startup of a predicted control circuit 20 in accordance with the teachings of the present invention is illustrated. Waveform "A" depicts a softstart feature of the presently preferred embodiment of the predicted control circuit 20. When power is initially applied, the operation of the control circuit 20 forces each sequence step to begin at 0 and ramp up to the desired set point. The illustrated waveform includes 13 repeating sequence steps. By starting at zero and ramping up, stress on the load coupled to the generator 22 is significantly reduced.

Waveform "B" illustrates a softstart feature of another embodiment of the predicted control circuit 20. The illustrated waveform includes five repeating sequence steps. In this embodiment, the drive point is related to the set point and sequence step in a manner similar to that illustrated in the first configuration of FIG. 5. Here, the set point for each sequence step is the same, resulting in a pulsating waveform.

The predictive control circuit of the present invention extends the operating range of digitally sampled control loops for generators having a pulsed output. The control circuit provides an output having transition times that are not limited by delays in the loop controller. The techniques of the present invention permit the use of relatively low performance digital conversion circuit components to generate high-performance pulsed outputs.

In addition, the predictive control circuit is designed with a comparatively small number of components that are less costly than high-performance components that are required in conventional circuits.

Thus it will be appreciated from the above that as a result of the present invention, a control circuit for generators and other power supply devices is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method of controlling a programmable output of a generator, the programmable output including an output level having a corresponding set point, the generator having a drive input which is driven to an actual drive point for controlling the output level of the programmable output, comprising the steps of:

determining a set point corresponding to a requested output level;

determining a predicted drive point corresponding to the set point;

forcing the actual drive point approximately to the predicted drive point; and then controlling the actual drive point of the generator drive input.

2. The method of claim 1 wherein the programmable output further includes at least one sequence step having a sequence point, an output level, and a set point, further comprising the step of:

determining the requested output level corresponding to the sequence step; and wherein the step of controlling applies for the remainder of the sequence step.

3. The method of claim 2 further comprising the steps of:

sensing the output level of the programmable output;

generating a digital output signal that is representative of the sensed output level; and storing the actual drive point corresponding to the sequence step;

wherein the step of controlling includes the step of comparing the set point to the digital output signal, such that the output level of the programmable output is controlled.

4. The method of claim 2 wherein the step of determining the predicted drive point comprises retrieving a stored drive point corresponding to the set point.

5. The method of claim 1 wherein the step of determining the predicted drive point comprises retrieving a stored drive point corresponding to the set point.

6. The method of claim 4 wherein the step of retrieving further includes locating the stored drive point in prediction memory.

7. The method of claim 3 wherein the step of storing the actual drive point further includes updating the predicted drive point based on the actual drive point.

8. The method of claim 7 wherein the step of updating the predicted drive point is based on a statistical measure of the actual drive point.

9. The method of claim 8 wherein the statistical measure is selected from the group of: peak, minimum, rolling average, and mean.

10. The method of claim 1 wherein the step of determining the predicted drive point comprises retrieving a stored drive point corresponding to the set point, and wherein the step of controlling includes the step of comparing a representation of the output level to the set point.

11. A control circuit for a generator, the generator for regulating input power to provide a programmable output signal having a desired time profile including a plurality of sequence steps, the generator having a drive input for driving the programmable output signal, comprising:

a signal converter coupled to the programmable output signal for generating a digital output signal that is representative of the programmable output signal;

sequence memory including a plurality of predetermined set points, each of said set points representing a desired voltage, current, or power level of a sequence step;

a sequence point controller operable to generate a programmed reference signal based on the plurality of set points, the programmed reference signal providing a representation of the desired time profile;

a loop controller operable in response to comparing the programmed reference signal and the digital output signal to provide a drive signal to the drive input such that an actual time profile of the programmable output signal substantially tracks the desired time profile;

prediction memory including at least one drive point, said drive point representative of the drive signal that corresponds to generating the desired voltage, current, or power level of a set point; and a drive point controller operable to couple the drive point to the loop controller such that the drive signal is driven approximately to the drive point.

12. The control circuit of claim 11 wherein the programmable output is a programmable voltage.

13. The control circuit of claim 11 wherein the programmable output is a programmable current.

14. The control circuit of claim 11 wherein the programmable output is a programmable power.

15. The control circuit of claim 11 wherein the signal converter is an analog to digital converter.

16. The control circuit of claim 11 wherein prediction memory comprises a drive point array.

17. The control circuit of claim 11 further comprising a sensor circuit coupled between the signal converter and the programmable output.

18. The control circuit of claim 16 wherein the drive point array includes at least one drive point corresponding to each sequence step.

19. The control circuit of claim 16 wherein the drive point array includes at least one drive point corresponding to each set point.

20. The control circuit of claim 16 wherein the drive point is representative of a statistical measure of the drive signal.

21. The control circuit of claim 11 wherein sequence memory comprises a sequence point array.

22. A control circuit for a generator, the generator for regulating input power to provide a programmable output signal having a desired time profile including a plurality of sequence steps, the generator having a drive input for driving the programmable output signal, comprising:

an analog to digital converter coupled to the programmable output signal for generating a digital output signal that is representative of the programmable output signal;

a sequence point array including a plurality of predetermined set points, each of said set points representing a desired voltage, current, or power level of a sequence step;

a sequence point controller operable to generate a programmed reference signal based on the plurality of set points, the programmed reference signal providing a representation of the desired time profile;

a loop controller operable in response to comparing the programmed reference signal and the digital output signal to provide a drive signal to the drive input such that an actual time profile of the programmable output signal substantially tracks the desired time profile;

a drive point array including a drive point corresponding to each of said sequence steps, said drive point representative of the drive signal that corresponds to generating the desired voltage, current, or power level of a set point; and a drive point controller operable to couple the drive point to the loop controller such that drive signal is driven approximately to the drive point.

* * * * *